US011179745B2

(12) United States Patent
Perez Romero et al.

(10) Patent No.: US 11,179,745 B2
(45) Date of Patent: Nov. 23, 2021

(54) MANUFACTURING AN ARRANGEMENT FOR TRANSFERRING ENERGY FROM A PRIMARY UNIT CONDUCTOR ARRANGEMENT BY A MAGNETIC OR AN ELECTROMAGNETIC FIELD TO A SECONDARY UNIT CONDUCTOR ARRANGEMENT

(71) Applicant: Bombardier Primove GmbH, Berlin (DE)

(72) Inventors: Sergio Alejandro Perez Romero, Alsbach-Haehnlein (DE); Éanna Curran, Darmstadt (DE); Federico Garcia, Rheinhausen (DE)

(73) Assignee: Bombardier Primove GmbH, Berlin (DE)

( * ) Notice: Subject to any disclaimer, the term of this patent is extended or adjusted under 35 U.S.C. 154(b) by 172 days.

(21) Appl. No.: 16/309,627

(22) PCT Filed: Jul. 3, 2017

(86) PCT No.: PCT/EP2017/066459
§ 371 (c)(1),
(2) Date: Dec. 13, 2018

(87) PCT Pub. No.: WO2018/007295
PCT Pub. Date: Jan. 11, 2018

(65) Prior Publication Data
US 2019/0308216 A1 Oct. 10, 2019

(30) Foreign Application Priority Data
Jul. 4, 2016 (GB) ...................................... 1611595

(51) Int. Cl.
*B05D 3/00* (2006.01)
*H01F 27/36* (2006.01)
(Continued)

(52) U.S. Cl.
CPC ............. *B05D 3/207* (2013.01); *H01F 27/36* (2013.01); *H01F 41/06* (2013.01); *H01F 41/069* (2016.01);
(Continued)

(58) Field of Classification Search
CPC ........ H01F 27/00; H01F 27/24; H01F 27/236; H01F 41/06; H01F 41/069; B05D 3/207;
(Continued)

(56) References Cited

U.S. PATENT DOCUMENTS

| 2002/0055009 A1 | 5/2002 | Esguerra et al. |
| 2004/0016560 A1 | 1/2004 | Esguerra et al. |

(Continued)

FOREIGN PATENT DOCUMENTS

| CN | 102015125 A | 4/2011 |
| CN | 102598168 A | 7/2012 |

(Continued)

OTHER PUBLICATIONS

Warth, "Magnetic Iron Ore as a Material for Concrete Blocks", Nature, 1901, 2 pages, vol. 65, No. 31.

(Continued)

*Primary Examiner* — Tabassom Tadayyon Eslami
(74) *Attorney, Agent, or Firm* — The Webb Law Firm

(57) ABSTRACT

A method of manufacturing an arrangement for transferring energy from a primary unit conductor arrangement by a magnetic or an electromagnetic field to a secondary unit conductor arrangement in which the field induces an electric voltage, wherein the method comprises the steps: arranging a conductor arrangement selected from the primary unit conductor arrangement and the secondary unit conductor arrangement in a first layer of the arrangement and providing a second layer, so that the second layer is located on a back side of the first layer opposite to a front side of the first layer (Continued)

Figure 1:
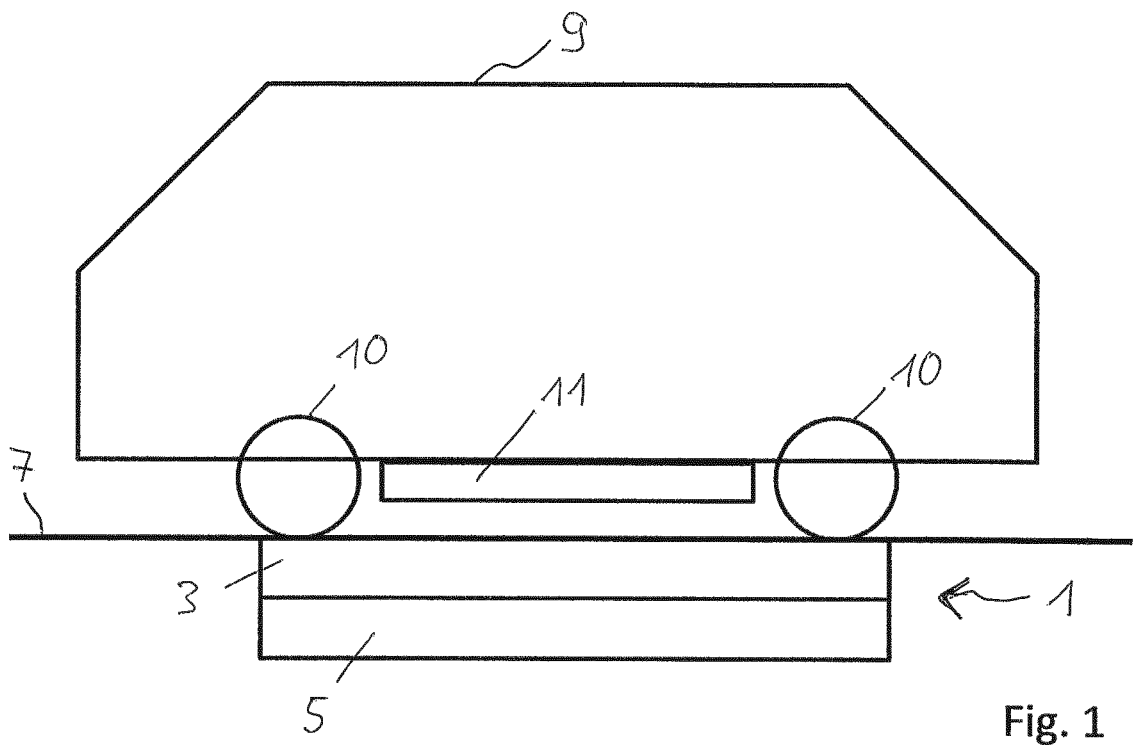

on which the magnetic or electromagnetic field is transferred or received during operation, wherein the second layer is made of a constituent material, comprising magnetic and/or magnetizable particles dispersed within the constituent material and wherein the magnetic or magnetizable particles are moved with respect to their positions and/or orientations within the constituent material before the constituent material is hard and the movement is caused by a magnetic field.

8 Claims, 3 Drawing Sheets

(51) Int. Cl.
H01F 41/06 (2016.01)
H01F 41/069 (2016.01)
H02J 50/10 (2016.01)
B60L 53/12 (2019.01)
H01F 38/14 (2006.01)
H01F 41/04 (2006.01)
H02J 7/02 (2016.01)

(52) U.S. Cl.
CPC ......... B60L 53/12 (2019.02); B60L 2270/147 (2013.01); H01F 38/14 (2013.01); H01F 41/04 (2013.01); H02J 7/025 (2013.01); H02J 50/10 (2016.02)

(58) Field of Classification Search
CPC ....... H02J 50/10; H02J 50/90; B60L 2200/26; B60L 5/00; B60M 7/00; B60M 2200/00; C04B 14/363; C04B 2111/00422; C04B 2111/0075; C04B 20/0012
USPC ........................................................ 336/234
See application file for complete search history.

(56) References Cited

U.S. PATENT DOCUMENTS

| | | | |
|---|---|---|---|
| 2010/0007457 A1* | 1/2010 | Yan ...................... | H01F 17/04 336/234 |
| 2010/0156344 A1 | 6/2010 | Inoue et al. | |
| 2011/0050382 A1 | 3/2011 | Baarman et al. | |
| 2011/0117334 A1 | 5/2011 | Lucas et al. | |
| 2014/0265612 A1 | 9/2014 | Choi et al. | |
| 2015/0137933 A1* | 5/2015 | Czainski ................. | H01F 41/06 336/84 R |
| 2015/0200048 A1 | 7/2015 | Han et al. | |
| 2016/0104937 A1 | 4/2016 | Kumura et al. | |
| 2016/0279855 A1* | 9/2016 | Hutter ..................... | B29C 48/16 |
| 2019/0245393 A1* | 8/2019 | Pantic ..................... | H02J 50/90 |

FOREIGN PATENT DOCUMENTS

| | | | |
|---|---|---|---|
| EP | 1097463 | B1 | 11/2002 |
| EP | 1662613 | * | 5/2006 |
| EP | 1662613 | A1 | 5/2006 |
| EP | 1947660 | A2 | 7/2008 |
| EP | 2897139 | B1 | 10/2017 |
| FR | 2976152 | A1 | 12/2012 |
| GB | 2485616 | A | 5/2012 |
| GB | 2502084 | A | 11/2013 |
| JP | 363216318 | * | 9/1988 |
| JP | 5372610 | B2 | 12/2013 |
| JP | 2014187412 | A | 10/2014 |
| WO | 9208678 | A1 | 5/1992 |
| WO | 9003404 | A1 | 1/2000 |
| WO | 2013165167 | A1 | 11/2013 |
| WO | 2014148311 | A1 | 9/2014 |

OTHER PUBLICATIONS

Zheng-Qiang Shi et al., "Concrete for Magnetic Shielding", Cement and Concrete Research, Elsevier Science Ltd, 1995; vol. 25., No. 5, pp. 939-944.
https://www.eltiempo.com/archivo/documento/CMS-16554031, (English-language abstract), (published in 2017).

* cited by examiner

MANUFACTURING AN ARRANGEMENT FOR TRANSFERRING ENERGY FROM A PRIMARY UNIT CONDUCTOR ARRANGEMENT BY A MAGNETIC OR AN ELECTROMAGNETIC FIELD TO A SECONDARY UNIT CONDUCTOR ARRANGEMENT

CROSS-REFERENCE TO RELATED APPLICATIONS

This application is the United States national phase of International Application No. PCT/EP2017/066459 filed Jul. 3, 2017, and claims priority to United Kingdom Patent Application No. 1611595.8 filed Jul. 4, 2016, the disclosures of which are hereby incorporated in their entirety by reference.

The invention relates to the manufacturing of an arrangement for transferring energy from a primary unit conductor arrangement by a magnetic or an electromagnetic field to a secondary unit receiving device in which the field induces an electric voltage during operation. The arrangement comprises a first layer comprising the primary or secondary unit conductor arrangement and a second layer comprising magnetic and/or magnetizable material. The second layer is located on a back side (e.g. a lower side) of the first layer. In case of a primary unit, the magnetic or electromagnetic field is transferred during operation to the secondary unit receiving device on a front side (e.g. an upper side) of the first layer, which front side is opposite to the back side. In case of a secondary unit, the magnetic or electromagnetic field is received during operation from the primary unit on a front side (e.g. a bottom side) of the first layer. Again, the front side is opposite to the back side of the unit.

The term "layer" covers, but is not limited to a volume which is completely filled by solid material. Furthermore, the term "layer" is not limited to volumes having constant thickness. For example, the second layer may have a constant thickness or, alternatively, the thickness may be larger in a central region compared to side regions of the second layer. Another term which can be used in line with embodiments of the present invention as a synonym for the second layer is "body". The term "unit" refers to either the primary unit or the secondary unit and is synonym for an inductive power transfer arrangement, and includes but is not limited to an arrangement consisting of a single piece or single module. Rather, the unit may be formed by an arrangement of distributed and spaced apart components, for example.

Furthermore, the invention relates to the manufacturing of a track for vehicles (e.g. a road for road vehicles or a rail track for rail vehicles) driving on the track which comprises an arrangement of the type mentioned above.

GB 2 502 084 A describes an arrangement of the type mentioned above. The arrangement is for providing vehicles with energy by magnetic induction and comprises a primary side electric conductor arrangement adapted to generate an electromagnetic field while an alternating electric current flows through the conductor arrangement and a field shaping layer comprising magnetizable material (in particular ferrite) adapted to shape magnetic field lines of the electromagnetic field. The field shaping layer comprises a plurality of elements made of the magnetizable material, wherein neighboring elements are positioned at a distance to each other. The elements may be in the shape of tiles.

Typical magnetizable elements are produced by sintering ferrite particles so as to form the solid element. The result of this separate process of manufacturing magnetizable elements are bodies with concentrated magnetizable material having a high density of permeability, i.e. the permeability is concentrated within a comparatively small volume. This facilitates the transport of the magnetizable material to the site where the arrangement is to be operated, but requires a separate manufacturing step. Furthermore, the magnetic field lines are concentrated during operation within the magnetizable elements. This results in energy losses during operation. Furthermore, the magnetizable elements adjoin other solid material of the arrangement in case of a monolithic structure, for example if the arrangement is part of a road or other drive way or parking area for vehicles or part of a charging pad or a receiver unit of an IPT system.

GB 2 485 616 A describes another example of the construction of a primary side arrangement of an inductive power transfer system. A lane for vehicles has a base layer and a layer of electrically conducting material (such as aluminum plates) on top of the base layer. This shielding layer is embedded in an intermediate layer. A block comprising recesses and electric lines extending within these recesses are embedded in a cover layer on top of the intermediate layer. Magnetic material can be placed within a further recess in the center line of the block.

In EP 1 097 463 B1 an embodiment including a ferrite concrete matrix is described. Particles of ferrite are dispersed within the concrete, wherein the ferrite particles have a size that is substantially larger than the size of a magnetic domain. This allows for a relatively large initial permeability and use the guidance of a magnetic flux for shielding.

WO 92/08678 describes the use of a magnetic concrete material for shielding of high and low frequency electrical installations and their magnetic field.

EP 2 897 139 A1 describes a composite ferrite sheet that may be formed of a resin containing metal powder particles.

It is an object of the present invention to provide a method of manufacturing an arrangement of the types mentioned above which has improved magnetic properties. In particular, the number of steps required for providing magnetic and/or magnetizable material shall be reduced compared to the use of pre-fabricated solid elements made of concentrated magnetic and/or magnetizable material. It is a further object of the present invention to provide a method of manufacturing an arrangement with reduced losses during the operation of an inductive charging system. Further objects are to manufacture a corresponding track for vehicles comprising the arrangement.

It is a basic idea of the present invention to provide and/or use a volume of constituent material as part of the arrangement for transferring energy from a primary unit to a secondary unit of an IPT system, wherein magnetic and/or magnetizable particles are dispersed within the constituent material.

As will be described in further detail below, within the meaning of the present invention, the term "constituent material" is used as a generic term for any material that solidifies or has solidified, in particular at a destined location, in a predetermined shape as a result of a thermal and/or chemical reaction such as curing, hardening and moulding. In particular, the term includes composite materials having more than one component, wherein the individual components of the composite material have different physical and/or chemical properties. Examples of constituent materials are concrete, asphalt, plastics, thermoplastics, glass, resin, and wax. In combination with the magnetic and/or magnetizable particles the constituent material constitutes a composite material with specific magnetic properties, for example specific magnetic properties for an inductive charging process. It is possible that the composite material comprises a further constituent material that for example reacts with the first constituent material. For the purpose of implementing an inductive charging system into a road or parking lot, concrete or asphalt (e.g. ordinary asphalt or glass asphalt) are appropriate materials. In a mobile device for inductive power transfer, IPT, such as a receiver or in a charging pad with the primary coil of an IPT system, the magnetic and/or magnetizable particles are preferably dispersed within a synthetic resin, wherein the synthetic resin may surround and hold a coil at least from one side. The constituent material may be arranged within a layer or a volume that is distanced from the coil.

In many IPT systems concrete volumes are used or can be used as constructional element of the arrangement. For example as part of a track for vehicles, such as a road for street or road vehicles, concrete volumes can be a part of the track. They are suitable for supporting the vehicles driving on the track. At least one further volume or layer can be placed optionally on top of the concrete volume, e.g. a concrete volume having different properties.

Since the constituent material with the magnetic and/or magnetizable particles can be also a constructional element of the primary or secondary unit, and since the constituent material comprises the magnetic and/or magnetizable particles, the constituent material has at least two functions in the arrangement, namely occupying a volume, in particular serving as a building or housing material, and optionally supporting at least one other volume and/or vehicles on the one hand, and providing magnetic permeability on the other hand. Therefore, the magnetic composite material, that may be a magnetic concrete, can replace at least a part of the magnetic elements such as ferrite bodies which are typically used in prior art primary or secondary units. Consequently, the effort for separately manufacturing magnetic elements made of concentrated magnetic material and for transporting these magnetic elements to the site of the primary unit can be reduced. In addition, magnetic concrete can be brought on site into the desired shape, similarly to the concrete of prior art IPT solutions. Furthermore, effort for correctly placing magnetic elements with the correct relative position and relative orientation to each other can be saved as well. In prior art solutions, the relative position and relative orientation of a plurality of elements made of concentrated magnetic material (such as ferrite plates) is essential, since the magnetic properties of the total IPT arrangement are significantly deteriorated otherwise. The reason for this sensitivity to correct placement of the magnetic elements is the high concentration of the magnetic material, i.e. the high density of the permeability. Preferably, the primary unit of the present invention does not comprise magnetic elements made purely of concentrated magnetic material at all, but only comprises one or more than one volume of magnetic composite material in order to provide for the magnetic properties of the arrangement. However, there are also embodiments of the present invention in which the back side, at least one of the lateral sides and/or part of the area in between the front side of the primary unit and the secondary unit is/are provided with at least one magnetic element made of concentrated magnetic material, such as at least one ferrite body. This at least one magnetic element can be manufactured in a conventional manner. In this embodiment of the present invention, the back side of the primary unit comprises at least one magnetic concrete volume.

Generally speaking, the front side of the primary unit is the side directed towards the secondary unit and the front side of the secondary unit is the side directed towards the primary unit. The back side of each unit is the side opposite to the front side, wherein the front side and the back side are related to the electric conductor arrangement of the primary or secondary unit, which electric conductor arrangement produces the magnetic or electromagnetic field while an electric current flows through the electric conductor arrangement (in case of the primary unit) or carries the electric current caused by the induced voltage (in case of the secondary unit). The lateral sides of the units of the IPT arrangement are the sides next to the electric conductor arrangement and in between the front side and the back side. To reduce losses, a lateral extension of the magnetic or electromagnetic field is generally not desired in IPT systems. Thus, one aspect of the present invention provides for a part of the second layer or a separate body of magnetic composite material) being arranged on the lateral side of the primary unit or of the secondary unit.

As mentioned above, the effort for providing the magnetic properties of the primary unit and/or secondary unit is reduced by the at least one magnetic composite material (e.g. concrete) volume. However, not only the effort in terms of work time for manufacturing is reduced, but also the costs of manufacture. In particular if a concrete volume is required or is favorable for performing constructional functions, it is comparatively easy and increases the costs of producing the concrete volume only very slightly to add magnetic and/or magnetizable particles to the concrete raw material before the material hardens. In particular, primary unit extending along the track of vehicles for wirelessly transferring energy to the vehicles during travel can be manufactured at low costs by forming corresponding elongated magnetic concrete volumes, for example a single magnetic concrete volume extending along the track, by pouring the magnetic concrete in a corresponding form. There is no principle limitation of the shape, in particular the length, of such a magnetic concrete volume, although in practice two or more sections of the total volume of the magnetic concrete may be separated by at least one extension gap, for example, so that thermal extension of the sections is possible without cracking the magnetic concrete.

Another advantage of the magnetic composite material is the fact that the material does not consist of magnetic and/or magnetizable particles only. Therefore, the concentration of the magnetic and/or magnetizable particles is smaller than for magnetic elements made of concentrated magnetic and/or magnetizable material, such as ferrite tiles. The smaller concentration reduces energy losses during operation of the IPT system. The additional volume which is required to provide the same magnetic effect, in particular the same field shielding effect and/or the same extent of redirecting (i.e. bending) of magnetic field lines in particular on the back side, is larger for the magnetic composite material compared to magnetic elements. However, for many applications, there is sufficient volume available and, as mentioned above, composite material (e.g. concrete) volumes may fulfill other desired functions in IPT arrangements. In addition, by dispersing the magnetic and/or magnetizable material over larger volumes compared to magnetic elements made of concentrated magnetic material, the magnetic field can be shaped in a manner which is not possible with concentrated magnetic material. In particular, the course of the magnetic field lines on the lateral sides can be different as a result of the smaller concentration of the magnetic field lines (i.e. the smaller intensity of the magnetic field) within the magnetic volume. For example, this makes it possible to reduce the magnetic field intensity sideways of the gap between the primary unit and the secondary unit during operation.

In particular cement concrete may be composed of aggregate components that are bonded together with a fluid cement which hardens over time. In case of Portland cement and other hydraulic cement concretes, when the aggregate is mixed together with the dry cement and water, the mixture forms a fluid mass that can be easily molded into a shape. The cement reacts chemically with the water and/or other ingredients to form a hard matrix which binds all the materials (including the magnetic or magnetisable material) together into a durable stone-like material that has many uses.

However, the use of concrete is not limited to concrete comprising hydraulic cement. The cement may be of the lime-type. In addition or alternatively, the cement may be non-hydraulic. Also, the invention includes other non-lime-type cement concretes comprising another type of binder. One example is polymer concrete. There are different ways of grouping concrete in classes. In the following, some examples of concrete groups are named. Certain types of concrete may fall into different of these groups: Cement concrete, asphalt concrete, polymer concrete, recycling concrete, self-consolidating concrete, fiber-reinforced concrete and autoclaved aerated concrete. Magnetic concrete, as proposed by the present invention, may belong to one or more of these groups.

Often, additives are included in the mixture to improve the physical properties, e.g. of the wet mixture and/or of the finished concrete. Most concrete is poured with reinforcing materials embedded to provide tensile strength, yielding reinforced concrete. However, it is preferred that the concrete, and more generally speaking, the magnetic composite material, does not comprise metallic material. This does not only apply to additives in the form of particles, but also to reinforcement material, such as metal rods. The electric conductivity of metal reduces the desired effect of shaping the magnetic field lines.

In known types of concrete, different additives (such as pozzolans or superplasticizers) give different behavior to the concrete as in its main characteristics are intended. The magnetic or magnetizable particles may be considered as one form of additives. In particular, ferromagnetic material such as ferrite powder or iron ore can be a part of the mixture of components which hardens to become the concrete.

For example, EP 1 097 463 B1 describes a magnetizable product comprising grains of a ferrite and a hydraulic cement. The result of the hardening of the initial mixture of the grains with other components is a cement matrix with inclusion of magnetizable grains. This type of initial mixture with water and in particular with additional construction aggregate (such as sand, gravel, crushed stone and/or slag) may be used to form a magnetic concrete volume. The concentration (i.e. the weight percentage or volume percentage) and/or size of the magnetic and/or magnetizable grain or particles may differ from the concentration mentioned in EP 1 097 463 B1.

In particular, the particle size or sizes of the magnetic and/or magnetizable particles may be in the range from 2 μm to 2 mm. Especially, the particle size is the largest length of the particle that can be measured in a straight direction. Depending on the source of the particles it is possible to use a powder with particle size(s) near the 2 μm limit or sintered particles having a particle size close to the 2 mm limit. Preferably, the particles replace parts of the constituent material of equal size(s). For example, in a concrete material, usually sand particles of about 0.5 mm particle size may be used. In this case, sintered ferrite particles of equal size(s) replace at least a portion of the sand particles. In particular, a ratio of 40% to 60% of the number of particles of the constituent material having the same size as the magnetic and/or magnetizable particles are replaced by the magnetic and/or magnetizable particles of the same size in the composite material. Even more advantageously, a ratio of 45% to 55% of the number of particles of the constituent material having the same size as the magnetic and/or magnetizable particles are replaced by the magnetic and/or magnetizable particles of the same size in the composite material. In the case of a polymeric resin as the constituent material, the magnetic and/or magnetizable particles do not replace a portion of the constituent material, but are rather mixed in as an additive.

Preferably, the particle size of the magnetic and/or magnetizable particles is chosen such that the size is large enough to receive a magnetic force that is greater than the forces of friction that act upon the particle within the constituent material. This allows the magnetic and/or magnetizable particles to be accelerated and being repositioned inside the constituent material. For example, if the constituent material is concrete, a preferred size of the magnetic and/or magnetizable particles that are to be moved within the non-cured concrete is between 0.1 mm and 1 mm.

When the initial mixture of the concrete contains a proportion of magnetic and/or magnetizable material, the concrete achieves a magnetic relative permeability greater than 1. A magnetizable material in such a mixture achieves magnetic permeability which interacts with a magnetic field as any ferromagnetic or ferrimagnetic material does. The strength of the interaction to an external magnetic field depends on the density of the magnetic and/or magnetizable material in the mixture and the magnetic properties of the material.

Resins as the constituent material likewise may be cast into a mold while at the same time or before the casting process the magnetic and/or magnetizable particles are dispersed within the resin. Preferably the resin is a synthetic resin such as a polymeric resin. Moreover, a separate mold is not necessarily required. In a preferred method step, the resin is cast inside a primary or secondary unit wherein a housing of the primary or secondary unit is provided which acts as a mold for the fluid resin. Likewise, instead of or in addition to a housing, the components of the primary unit and/or secondary unit may act as a mold. The magnetic or magnetizable particles may be added at an earlier step before the resin is cast into the final shape. An additional or alternative preferred method step is surrounding the electric conductor arrangement, e.g. at least one winding, of the primary unit or the secondary unit by a first resin without magnetic and/or magnetizable particles. A preferred step in the middle is to at least harden the first resin. In a preferred subsequent step, a second resin is cast into the primary or secondary unit including the magnetic and/or magnetizable particles. The particles may be added after the second resin is cast but before the second resin has hardened. In even another step, the particles may be concentrated to certain areas or sections of the second resin. This might be accomplished by manually dispersing the magnetic and/or magnetizable particles in these sections or by applying a direct or alternating current to the winding of the primary respective secondary unit.

In particular, an arrangement may be adapted for transferring energy from a primary unit conductor arrangement by a magnetic or an electromagnetic field to a secondary unit receiving device in which the field induces an electric voltage, wherein the arrangement comprises:

a first layer comprising the primary unit conductor arrangement and a second layer located on a back side of the first layer opposite to a front side of the first layer on which the magnetic or electromagnetic field is transferred during operation to the secondary unit receiving device, wherein the second layer is made of a constituent material comprising magnetic and/or magnetizable particles dispersed within the constituent material.

Furthermore, an arrangement may be adapted for transferring energy from a primary unit conductor arrangement by a magnetic or an electromagnetic field to a secondary unit receiving device in which the field induces an electric voltage, wherein the arrangement comprises:

a first layer comprising the secondary unit conductor arrangement and a second layer located on a back side of the first layer opposite to a front side of the first layer on which the magnetic or electromagnetic field is received during operation from the primary unit, wherein the second layer is made of a constituent material comprising magnetic and/or magnetizable particles dispersed within the constituent material.

Embodiments, examples, their manufacturing and further possible features of the arrangement have been described above and will be described below. The invention also relates to the manufacturing of a track for vehicles driving on the track comprising the arrangement according to any of its embodiments. In particular, the first layer may be an upper layer on top of the second layer. Therefore, the field can spread upwards to a receiving device and the magnetic concrete below the primary unit conductor arrangement shapes the magnetic field lines and shields the area below the second layer.

Furthermore, and in particular to create a road or a track, a cover layer may be located/placed above the first layer. The cover layer preferably has non-magnetic properties and allows the magnetic flux formed by the primary unit conductor arrangement to pass through and reach the secondary unit conductor arrangement or vice versa.

A method is proposed of manufacturing an arrangement for transferring energy from a primary unit conductor arrangement by a magnetic or an electromagnetic field to a secondary unit receiving device in which the field induces an electric voltage, wherein the method comprises the steps:

arranging the primary unit conductor arrangement or the secondary unit conductor arrangement in a first layer of the arrangement and providing a second layer, so that the second layer is located on a back side of the first layer opposite to a front side of the first layer on which the magnetic or electromagnetic field is transferred or received during operation, wherein the second layer is made of a constituent material, comprising magnetic and/or magnetizable particles dispersed within the constituent material.

As will be described in more detail, the magnetic or magnetizable particles are moved with respect to their positions and/or orientations within the constituent material before the constituent material is hard and the movement is caused by a magnetic field.

Embodiments of the method follow from the embodiments of the arrangement.

In particular, the magnetizable particles comprise ferrimagnetic particles. In addition or alternatively, ferromagnetic particles, such as iron ore may be dispersed in the constituent material. However, ferrimagnetic particles have the same advantage as concentrated ferrite bodies compared to ferromagnetic material, such as iron. Since the ferrimagnetic particles, in particular ferrite particles, do not have to be compacted so as to form concentrated magnetic or magnetizable elements, not only ferrimagnetic particles typically used for producing concentrated magnetic or magnetizable elements can be used, but also other ferrimagnetic particles. In particular, the ferrimagnetic particles do not require properties which qualify them for sintering the particles (in particular powder) so as to form concentrated elements.

According to an embodiment, a shield made of electrically conducting material may be arranged on the second layer opposite to the first layer. Although the second layer preferably has a larger thickness than conventional magnetic layers made of concentrated magnetic and/or magnetizable elements, an additional layer of electrically conducting material provides an additional shielding effect so that the field intensity beyond the electrically conducting material is very small.

According to the method of manufacturing the arrangement, the positions and/or orientations of the magnetic or magnetizable particles within the constituent material are varied before the constituent material is hard. In particular, this refers to types of concrete which are in a fluid state before they become hard. In the fluid state, the magnetic and/or magnetizable particles can move relative to other ingredients of the constituent material. The movement of the magnetic and/or magnetizable particles is caused by a magnetic field. Consequently, a local distribution of the particles can be achieved which improves the magnetic properties of the constituent material for the operation of the primary unit.

It is preferred that the conductor arrangement of the primary or secondary unit is used to produce a magnetic field that moves the magnetic and/or magnetizable particles within the constituent material before the constituent material is hard. This embodiment has the advantage that the distribution and/or orientation of the magnetic and/or magnetizable particles is adapted and optimized to the primary unit or secondary unit conductor arrangement which is also used during operation of the IPT system for transferring energy from the primary unit to the secondary unit of the system. Therefore, the effect of the magnetic layer, namely redirecting the magnetic field lines, is amplified. Optionally, the other unit of the IPT system (in case of the primary unit the secondary unit and vice versa) or at least the magnetic and/or magnetizable parts of the other unit may also be present when the magnetic and/or magnetizable particles within the constituent material are moved. In this case, the course of the magnetic field lines is the same as during operation later and the magnetic and/or magnetizable particles are moved to the corresponding position and/or are oriented correspondingly within the constituent material.

In particular, the primary unit conductor arrangement may be operated by conducting an electric current through the primary unit conductor arrangement before the constituent material of the second layer is hard. Consequently, it is very easy to produce the magnetic field required for moving the magnetic and/or magnetizable particles within the constituent material. It is just required to use the primary unit conductor arrangement in a manner for which it is designed.

A direct current or an alternating current may flow through the primary or secondary unit conductor arrangement before the constituent material of the second layer is hard. It is preferred that a direct current is used in this pre-operation taking place during an installation of the IPT system to produce a magnetic field having a polarity that is not reversed during the pre-operation. In these cases, the electric current through the primary and secondary unit conductor arrangement during pre-operation and/or during operation of the IPT system is also a direct current, namely a direct current having the same direction.

A magnetic force is generated upon application of a magnetic field acting upon a particle of the magnetic and/or magnetizable material. To further increase the efficiency of the magnetic force it is proposed to generate a series of direct current pulses through the primary unit conductor arrangement to generate such a particle movement. By pulsing the current and, thus, the magnetic field with a given (in particular a higher) intensity, it is possible to not only move particles in close proximity of the conductor but also at a larger distance due to the radiative properties of the magnetic field generated. Since the current is pulsed, the current repeatedly rises and falls, in particular according to a corresponding frequency. The pulsing allows an in particular periodic application of force to the particles which will move accordingly. A low frequency of the pulses is preferred such that the force and movement level before the next pulse. In other words, a time gap of no acting magnetic field is created between two pulses to allow the effects of the first pulse onto the magnetic field at least partially fade away, but such that the velocity of the particles remains to a certain extent until the next, second pulse starts. Therefore, the particles are advantageously accelerated in a controlled manner such that a high resistance of the movement due to viscosity of the constituent material is avoided. According to another embodiment, a pulse width and pulse frequency of the pulses is chosen such that movements of the particles stop before the next pulse starts.

Further, a strength of the magnetic force is chosen depending on (and preferably proportional to) the viscosity of the constituent material. In other words, the applied electric current is higher during pre-operation in case of higher viscosity of the constituent material and vice versa. Also the viscosity of the constituent material such as cement may be chosen in a way to positively affect the redistribution of the particles of magnetic and/or magnetizable material. For this purpose it is provided that an additive is added to the constituent material.

If the primary unit will be operated to produce an electromagnetic field by conducting an alternating electric current through the primary unit conductor arrangement during operation of the IPT system, also an alternating current is conducted through the primary or secondary unit conductor arrangement before the constituent material of the second layer is hard. Despite the fact that the alternating current produces an alternating magnetic field and, therefore, the magnetic polarity of the magnetic and/or magnetizable particles is reversed several times before the constituent material is hard, the particles are moved and in particular oriented in a manner which is optimal for later operation of the IPT system.

It is preferred that the frequency of the alternating electric current through the primary or secondary unit conductor arrangement is smaller before the constituent material of the second layer is hard compared to the frequency during operation of the IPT system. For example, the alternating current during operation of the IPT system may be in the range of at least 1 kHz. In contrast, the frequency of the alternating current before the constituent material is hard is preferably below 100 Hz, in particular below 60 Hz and more preferred below 10 Hz. According to a preferred example, the frequency may be in the range of 1 Hz, not exceeding 2 Hz. An alternating electric current having a small frequency is sufficient to move and orient the magnetic and/or magnetizable particles in the desired manner. Furthermore the particles move faster to their optimal position when the frequency is small. It is also possible, to vary the frequency while the constituent material is hardening.

The expression "before the constituent material is hard" refers to the property of said constituent materials, such as concretes, having an initial state in which the constituent material can be molded or shaped. In this initial state and during the process of becoming hard, the constituent material is not as hard as in the final state when the material is ready for permanent use. The process of becoming hard is also named "curing". In the final state, the constituent material can also be named "cured".

The invention also relates to the manufacturing of an inductive power transfer arrangement for transferring or receiving energy of a magnetic or an electromagnetic field, the arrangement comprising:

an electric conductor arrangement, and a magnetic and/or magnetizable layer comprising magnetic and/or magnetizable particles dispersed within a constituent material, wherein the electromagnetic or magnetic field induces an electric voltage in the electric conductor arrangement or wherein the electromagnetic or magnetic field is generated by an electric current flowing through the electric conductor arrangement, and wherein magnetic field lines of the electromagnetic or magnetic field are redirected by the magnetic and/or magnetizable particles dispersed within the constituent material during operation to reduce magnetic losses.

In a further aspect of the invention the magnetic and/or magnetizable particles are arranged as at least one flux guiding channel extending along at least one space curve inside the magnetic and/or magnetizable layer. Thus, a magnetizable structure is defined by the flux guiding channels for guiding the magnetic flux during operation of the IPT device. The flux guiding channels may be preemptively arranged, e.g. during a hardening process of the constituent material, by dispersing a higher concentration of magnetic and/or magnetizable particles along said space curves. The magnetic and/or magnetizable particles do not need to be arranged in uninterrupted line but rather in channels with a certain special extension around the space curve.

Moreover in a preferred embodiment, in a precast state, in which the constituent material is not yet hard, the amplitude of the magnetic component of the electromagnetic field is greater than zero, such that the magnetic and/or magnetizable particles are arranged in said flux guiding channels, wherein the at least one space curve is a path of locally minimized magnetic resistance of the magnetic or electromagnetic field. This structure can be formed for example by applying an electric current to the electric conductor arrangement before the cured material hardens. The electric current is the source of a magnetic force acting on the magnetic and/or magnetizable particles which in turn will align along said space curves during the hardening process and form the structures that will serve as the flux guiding channels. This process is not limited to concretes but can be applied to plastics and resins as well. Further, an external conductor arrangement may produce the electromagnetic field, for example if the constituent material is a fluid resin arranged inside a secondary unit of an IPT system, an alternating current may be applied to the primary unit conductor arrangement that extends to the secondary unit conductor arrangement and beyond and will form the magnetic or magnetizable structure while the resin hardens. After the hardening process is complete and the constituent material is hardened, the magnetic and/or magnetizable structure will stay in place and is a path of minimized local magnetic resistance. There may be more than one minimized local magnetic resistance structures.

Preferably, the inductive power transfer device further comprises a structural layer for holding the electrical conductor arrangement. The structural layer may have the same properties as the first layer described above.

Additionally, the structural layer defines a distance between the electrical conductor arrangement and the magnetic or magnetizable layer. At least part of the structural layer defines the distance. A distance between the electrical conductor arrangement and the magnetic and/or magnetizable layer eliminates the risk of short circuiting the conductor by accidentally placing magnetic and/or magnetizable particles in direct contact with electrical lines of the electrical conductor arrangement and electrically connecting them at unwanted locations.

In a further embodiment it is provided that the magnetic layer comprises an opening arranged between the electrical conductor arrangement and a counterpart electrical conductor arrangement for allowing the magnetic or electromagnetic field to be transmitted through the opening and to or from the electrical conductor arrangement respectively from or to the counterpart electrical conductor arrangement.

By moving the magnetic and/or magnetizable particles within the constituent material, the magnetic resistance of the constituent material with respect to the magnetic fields during operation of the IPT system is reduced. Therefore, the particles form a geometric arrangement such that the magnetic resistance of the primary or secondary unit is minimized.

Figure 2:
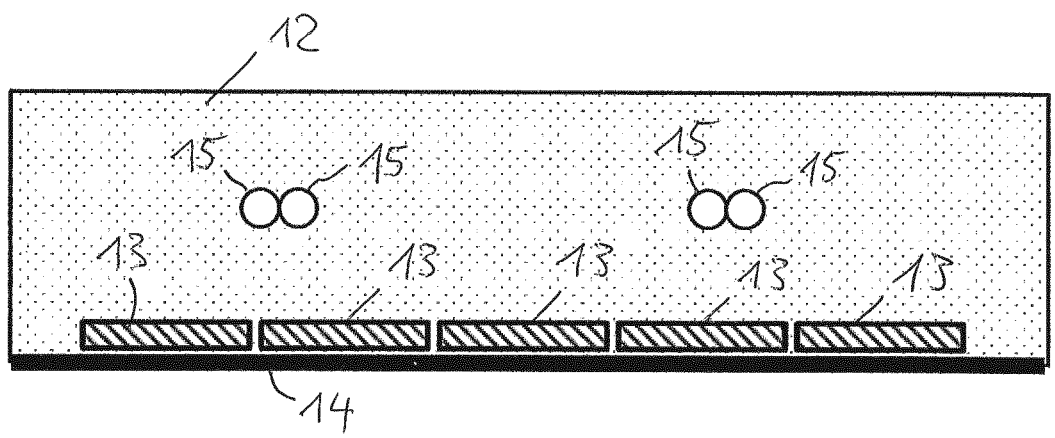
Figure 3:
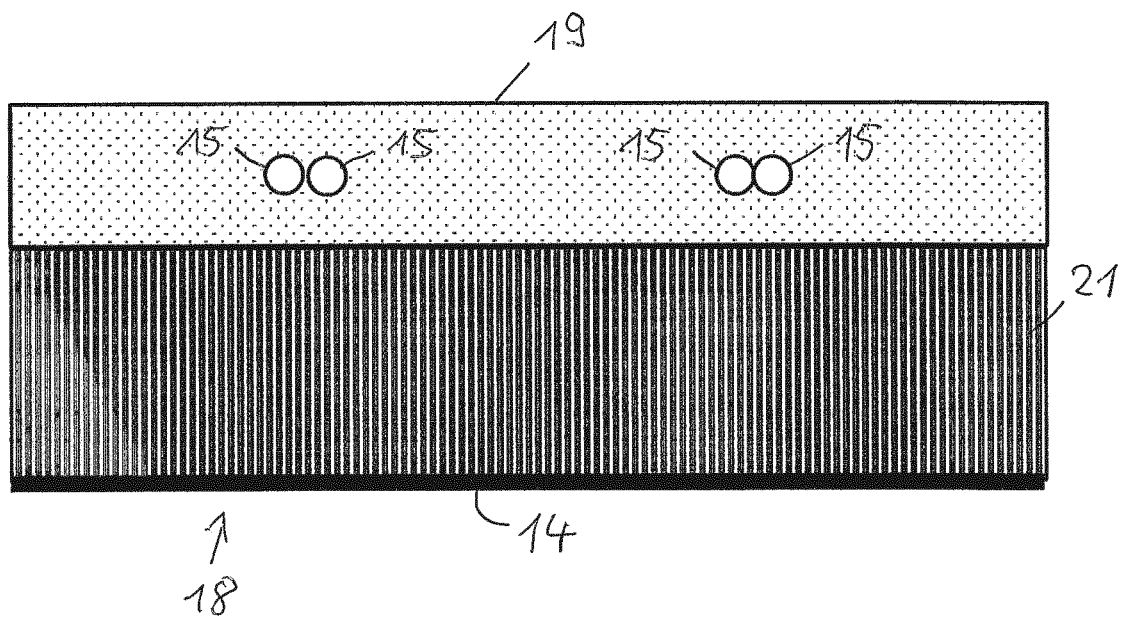
Figure 4:
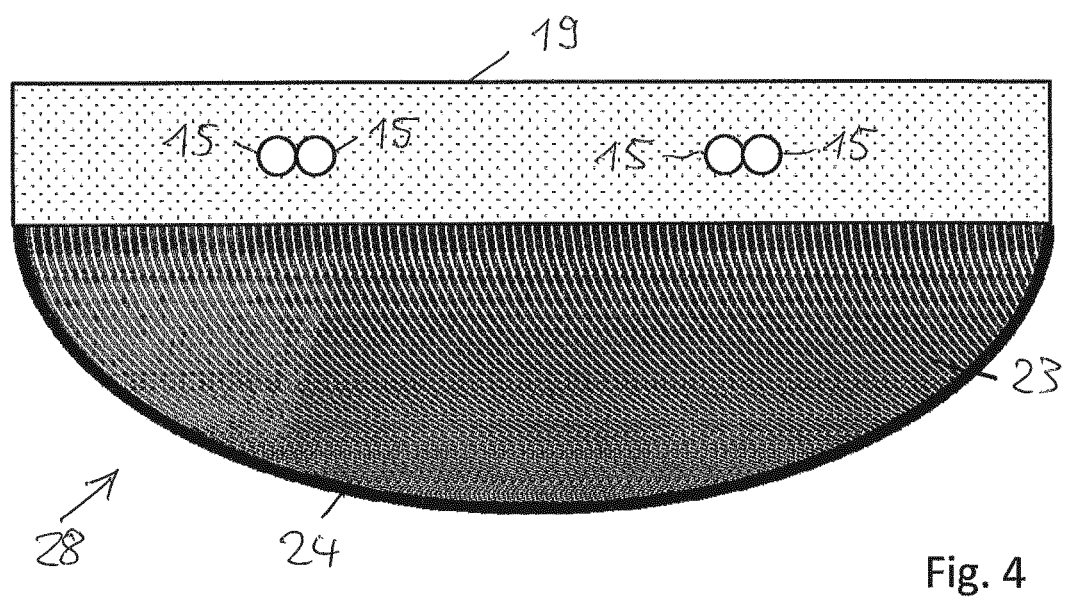
Figure 5:
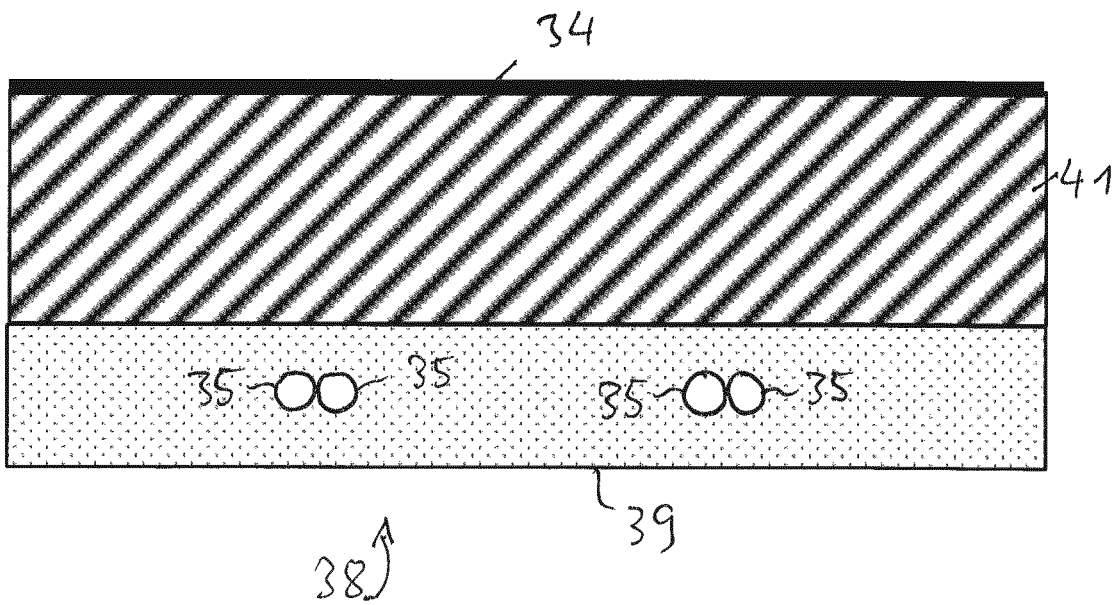
Figure 6:
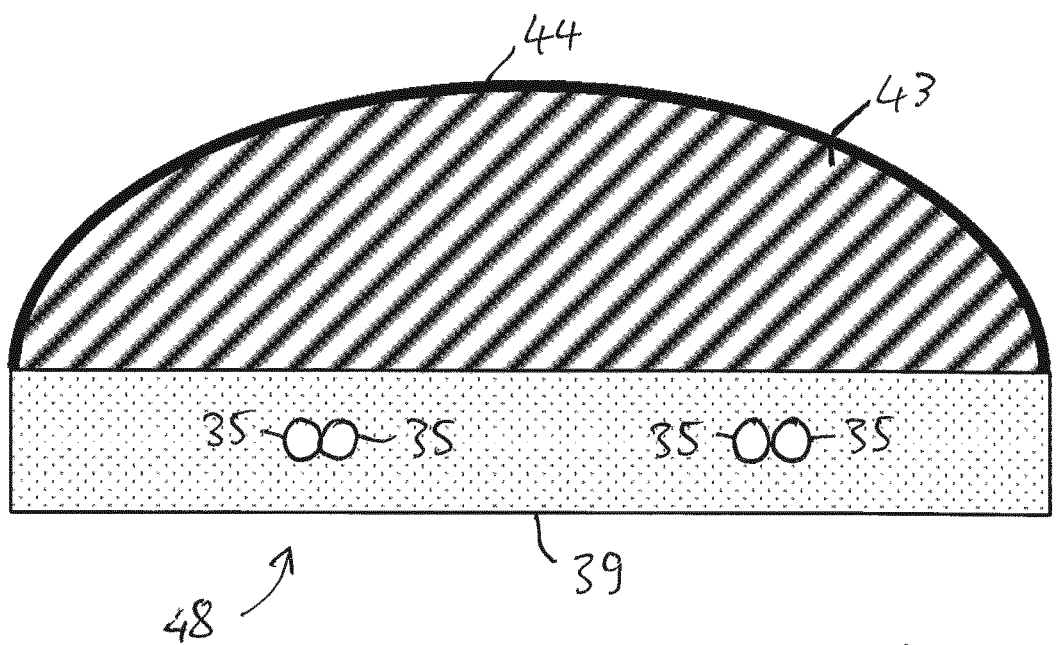

Embodiments of the arrangement and of the present invention will be described with reference to the attached figures in the following. The individual figures show:

FIG. 1 a schematic side view of an IPT system with a primary unit conductor arrangement integrated in a road for generating a magnetic or electromagnetic field and with a vehicle driving on the road, wherein a secondary unit receiving device for receiving the field is attached to the vehicle, FIG. 2 a primary unit with elements made of concentrated magnetic and/or magnetizable material, FIG. 3 a first example of a primary unit, wherein the second layer is made of a constituent material, comprising magnetic and/or magnetizable particles dispersed within the constituent material, FIG. 4 a second example of a primary unit, wherein the second layer is made of a constituent material, comprising magnetic and/or magnetizable particles dispersed within the constituent material, FIG. 5 a first example of a secondary unit, wherein the second layer is made of a constituent material, comprising magnetic and/or magnetizable particles dispersed within the constituent material, and FIG. 6 a second example of a secondary unit, wherein the second layer is made of a constituent material, comprising magnetic and/or magnetizable particles dispersed within the constituent material.

FIG. 1 schematically shows a side view of a vehicle 9 driving on the surface of a road 7. Two of the wheels of the vehicle 9 are denoted by reference numeral 10. In addition, the vehicle 9 comprises a secondary unit receiving device 11 of an IPT system. The primary unit arrangement 1 of the IPT system is integrated in the road 7. Typically, the primary unit 1 comprises at least a first layer 3 with the primary unit conductor arrangement (not shown in detail in FIG. 1) and a second layer 5 with magnetic and/or magnetizable material. In many cases, an additional layer of electrically conducting material is present in particular below the second layer 5, but possible also on the lateral sides of the magnetic layer and/or of the first layer.

The schematic construction of an IPT system shown in FIG. 1 does not limit the present invention to this example. In particular, the layers of the primary unit can be shaped differently. For continuous energy transfer from the road to the vehicle while the vehicle drives on the road, at least the first layer and the second layer may continuously extend along the travel direction of the vehicle. For so-called static energy transfer while the vehicle stops, the first layer and the second layer may be shaped in a different manner as well. For example, the second, magnetic layer may also extend on the lateral sides of the first layer.

In addition, none of the layers is restricted to a constant thickness. Furthermore, the first layer which comprises the primary unit conductor arrangement, may or may not be a layer with material (such as non-magnetic concrete) in which the primary unit conductor arrangement is embedded.

The cross-section of a primary unit 12 shown in FIG. 2 corresponds to prior art solutions. For static IPT applications, the cross-section may be a cross-section in the image plane of FIG. 1. In dynamic IPT applications, the cross-section of FIG. 2 may be one of several identical or similar cross-section in a plane perpendicular to the travel direction of vehicles.

A volume 12 of concrete which has a rectangular shape in the simplified schematic example of FIG. 2 comprises the embedded primary unit conductor arrangement. In FIG. 2, the cross-sections of four electric lines 15 of the primary unit conductor arrangement are visible. Also, elements 13 made of concentrated magnetic and/or magnetizable material are embedded in the concrete volume 12 below the electric lines 15. At the bottom of the concrete volume 12, there is a layer of electrically conducting material 14. During operation, the magnetic or electromagnetic field produced by the electric current through the conductors 15 is redirected within the magnetic elements 13 so that the magnetic field lines (not shown in the figures) extend mainly in horizontal direction through the elements 13 and are bent upwards on the lateral sides of the elements.

FIG. 3 shows a cross-section of a primary unit IPT arrangement. With respect to the orientation of the cross-section, the description of FIG. 2 may apply correspondingly. The arrangement 18 comprises a first (upper) layer of material in which electric lines 15 of the primary unit 18 are embedded. The arrangement of the primary unit conductors may be or may not be the same as in the prior art example shown in FIG. 2. The material of the upper (first) layer 19 or structural layer 19 of the arrangement 18 may be concrete. However, other constructions are also possible. For example, a pre-fabricated package of the primary unit conductor arrangement may be embedded on site within concrete or asphalt. According to another example, the primary unit conductor arrangement may be positioned within shaped blocks that comprise recesses for receiving the individual lines of the conductor arrangement.

The arrangement 18 of FIG. 3 comprises a second layer 21 which is made of concrete comprising magnetic and/or magnetizable particles. Below the second layer 21, there is a layer of electrically conducting material 14 as an additional shield. The second layer 21 is arranged at a distance to the electric lines 15. In particular, the distance may be predefined by installing, such as casting, pouring, mounting and so forth, a section of the first layer 19 between the second layer 21 and the electric lines 15. To facilitate the implementation of the distance, a frame, in particular a removable frame, for holding the electric cable 15 in place during the installation or filling process of the distance may be installed prior to the installation of the installation or filling process.

During operation, the magnetic field lines of the field produced by the current through the electric lines 15 are redirected within the magnetic concrete of the second layer 21. The curvature of the magnetic field lines may be different (in particular having larger radii of curvature) compared to the arrangement shown in FIG. 2, but the total field shaping effect of the magnetic concrete may be similar to the prior art solution schematically shown in FIG. 2. The magnetic field lines are continuously bent within the magnetic concrete so that they are redirected into nearly horizontal direction and on the lateral sides of the magnetic concrete bent upwards in the direction of the secondary unit part of the IPT arrangement.

FIG. 4 shows a primary unit 28 according to another example of the present invention. The first layer 19 may be constructed in the same manner or in a different manner as described with reference to FIG. 3. The second layer 23 does not have a constant layer thickness as in the arrangement 18 of FIG. 3, but its bottom surface is curved so that the lower surface line which is shown in the cross-section of FIG. 4 is convex. In particular, the surface line has a parabolic shape. A vertical line (not shown) in the center of FIG. 4 may be the line of symmetry of the lower surface line of the second layer. In addition, the symmetry line may also be the symmetry line of the first layer 19.

In static IPT applications, in particular but not exclusive, the cross-section shown in FIG. 4 may be an arbitrary cross-section in a vertical plane. In case of the vertical line in the center of the arrangement being the symmetry line, the total arrangement is rotationally symmetric. In particular, the lower surface of the second layer has a concave shape. In the case shown, the lower surface of the second layer 23 has the surface shape of a paraboloid. A paraboloid creates a focal point of the magnetic field and, therefore, is preferable over other shapes such as circular, squared, rectangular, undulated or pyramidal shapes.

In dynamic IPT applications, in particular but not exclusive, the cross-section shown in FIG. 4 may be a cross-section in a plane extending perpendicularly to the travel direction of the vehicles driving on a track that comprises the primary unit. In the direction perpendicular to the image plane of FIG. 4, the arrangement extends along the path of travel and, at many different travel positions on the path of travel, the same cross-section as shown in FIG. 4 applies to the primary unit. In particular, the shape of the lower edge area of the second layer 23 has the shape of an extruded parable that is extruded in the direction perpendicular to the plane of the parable.

As shown in FIG. 4, an additional layer of electrically conducting material 24 may be present in order to provide an additional shield for shielding the area below the layer against the field produced by the primary unit conductor arrangement. In the preferred example shown in FIG. 4, the electrically conducting material 24 extends along the lower surface of the second layer 23. In any case, the second layer 23 is made of concrete comprising magnetic and/or magnetizable particles.

As follows already from the above description of FIG. 4, a primary unit having a convex lower surface of the second layer is not restricted to the shape shown in FIG. 4. Rather, the curvature of the lower surface line of the second layer may be different. Furthermore, the first layer comprising the primary unit conductor arrangement is not restricted to the embodiment shown in FIG. 4. Other examples of a first layer have been described above.

In any case, the second layer with a convex lower surface line in the cross-section has the advantage that the shape of the magnetic concrete volume is optimized and adapted to the smooth curvature of the magnetic field lines which are redirected during operation of the IPT system within the second layer. In addition, the preferred additional electrically conducting material below the second layer reflects and concentrates the field that transports energy from the primary unit to the secondary unit. Therefore, a secondary unit receiving device positioned above the central area of the primary unit is positioned in a region where the field intensity is larger than sideways of the central region. As a result, the efficiency of energy transfer is increased.

FIG. 5 shows a cross-section of a secondary unit of an IPT system. The description of FIG. 3 applies correspondingly. The differences compared to FIG. 3 are described in the following.

The first layer 39 is the lower layer of the unit and the second layer 41 made of the magnetic constituent material is the upper layer of the unit. Therefore, a magnetic field or an electromagnetic field can be received by the electric lines 35 embedded in the first layer 39. The field induces an electric voltage in the electric lines 35 during operation. Magnetic field lines (not shown) are redirected by the magnetic and/or magnetizable particles within the second layer 41. At the top of the constituent material volume of the second layer 41, there is a layer of electrically conducting material 34. The secondary unit shown in FIG. 5 may comprise, for example, the secondary unit receiving device 11 shown in FIG. 1.

FIG. 6 shows a cross-section of a secondary unit of an IPT system. The description of FIG. 5 applies correspondingly. The differences compared to FIG. 4 are described in the following.

The first layer 39 is the lower layer of unit and the second layer 43 made of the magnetic constituent material is the upper layer of the unit. Therefore, a magnetic field or an electromagnetic field can be received by the electric lines 35 embedded in the first layer 39. The field induces an electric voltage in the electric lines 35 during operation. Magnetic field lines (not shown) are redirected by the magnetic and/or magnetizable particles within the second layer 43. At the upper surface of the constituent material volume of the second layer 43, there is a layer of electrically conducting material 44.

During a hardening process of the second layer 21, 23; 41, 43, a current may be guided through the electric line 15; 35. The particles dispersed in the second layer 21, 23; 41, 43 will be moved into an advantageous position through the magnetic field generated by the electric current. As a result, the magnetic resistance during the later operation of the inductive power transfer system is reduced in comparison to an even distribution of the magnetic particles in the constituent material.

The invention claimed is:

1. A method of manufacturing an arrangement for transferring energy from a primary unit conductor arrangement by a magnetic or an electromagnetic field to a secondary unit conductor arrangement in which the magnetic or the electromagnetic field induces an electric voltage, wherein the method comprises the steps:

embedding a conductor arrangement selected from the primary unit conductor arrangement and the secondary unit conductor arrangement within a first layer of the arrangement;

providing a second layer, so that the second layer is located on a back side of the first layer opposite to a front side of the first layer on which the magnetic or electromagnetic field is transferred or received during operation, wherein the second layer is made of a constituent material, comprising magnetic and/or magnetizable particles dispersed within the constituent material and wherein the magnetic or magnetizable particles are moved with respect to their positions and/or orientations within the constituent material before the constituent material is hard and the movement is caused by a magnetic field;

operating the conductor arrangement by conducting an electric current through the conductor arrangement before the constituent material of the second layer is hard to produce the magnetic field that causes movement of the magnetic and/or magnetizable particles within the constituent material; wherein the arrangement is one of the following:

a track upon which vehicles will travel, wherein the track comprises the first layer and the second layer of the arrangement, a charging pad to be used during charging of a vehicle, wherein the charging pad comprises the first layer and the second layer of the arrangement, or a parking area upon which vehicles will stop, wherein the parking area comprises the first layer and the second layer of the arrangement.

2. The method of claim 1, wherein the magnetizable particles comprise ferrimagnetic particles.

3. The method of claim 2, wherein a shield made of electrically conducting material is arranged on the second layer opposite to the first layer.

4. The method of claim 1, wherein a shield made of electrically conducting material is arranged on the second layer opposite to the first layer.

5. The method of claim 1, wherein the conductor arrangement that is operated in order to cause movement of the magnetic and/or magnetizable particles within the constituent material is the primary unit conductor arrangement.

6. The method of claim 1, wherein the first layer comprises a constructional element, wherein the constructional element is concrete or asphalt.

7. The method of claim 1, wherein a magnetic and/or magnetizable structure comprising the magnetic and/or magnetizable particles within the constituent material is created based on operating the conductor arrangement.

8. The method of claim 7, wherein the conductor arrangement that is operated in order to cause movement of the magnetic and/or magnetizable particles within the constituent material is the primary unit conductor arrangement.

* * * * *